Aug. 26, 1941.                B. B. HARDING                    2,253,783
                            SIPHONING COFFEE MAKER
                            Filed April 4, 1938              2 Sheets-Sheet 1
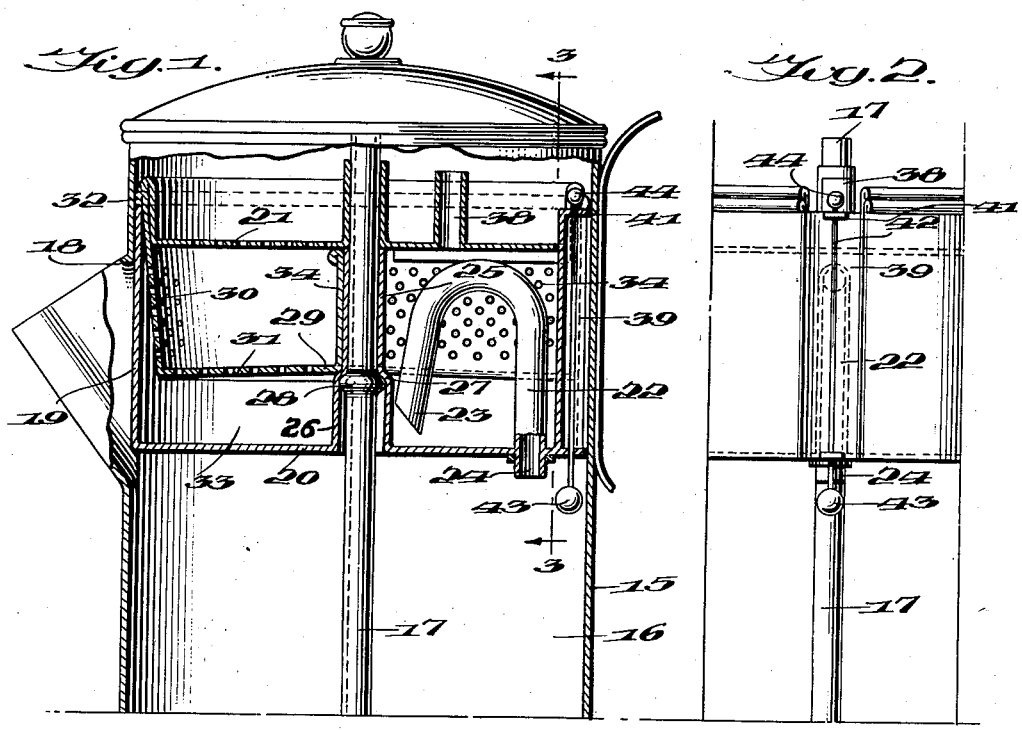
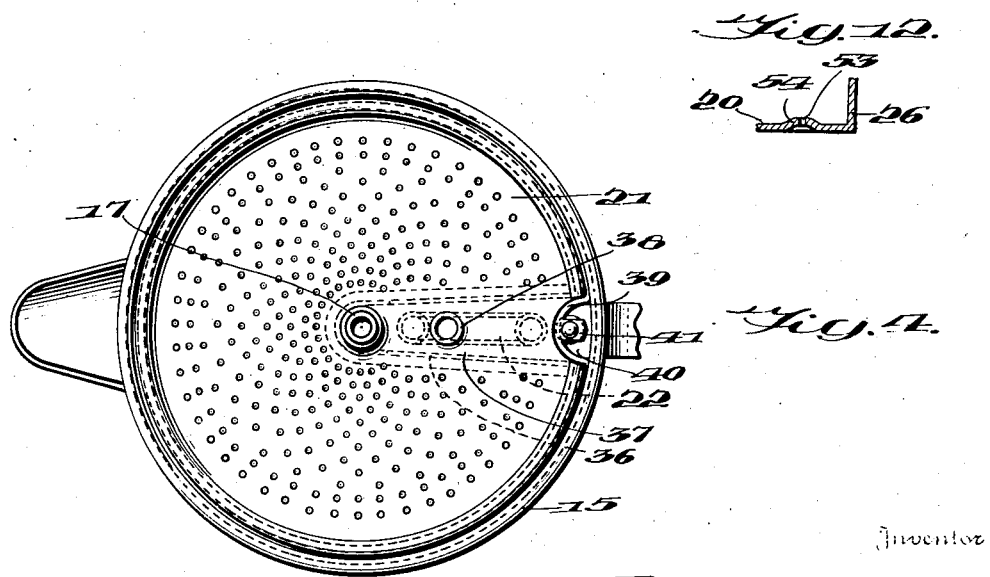
Inventor
Brooks B. Harding,
By Edmund H. Perry Jr
        Attorney

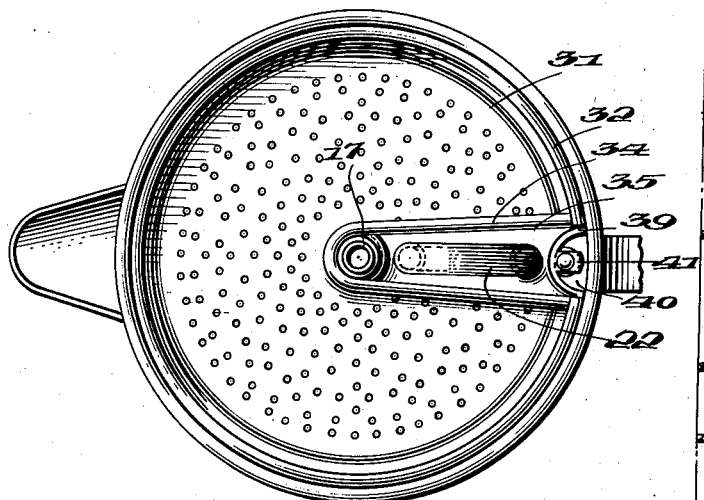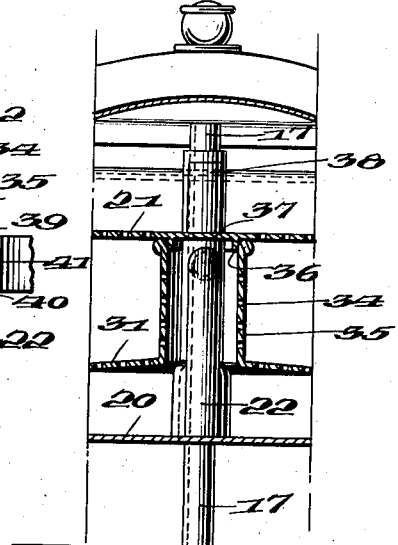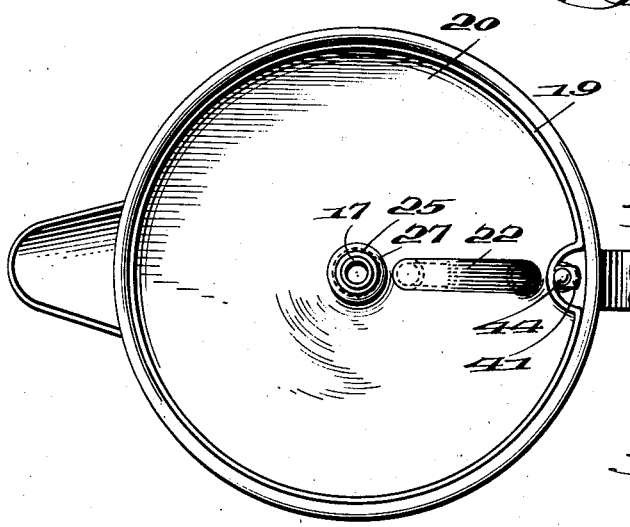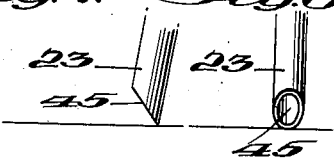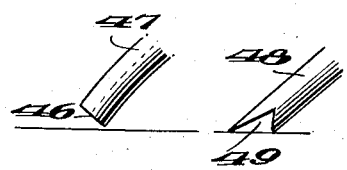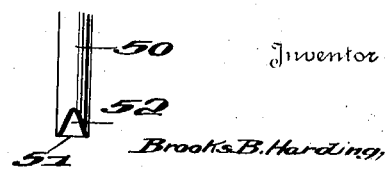
Inventor
Brooks B. Harding,
By Edmund H. Parry
Attorney Patented Aug. 26, 1941

2,253,783

UNITED STATES PATENT OFFICE 2,253,783

SIPHONING COFFEE MAKER

Brooks B. Harding, Freeport, N. Y.

Application April 4, 1938, Serial No. 200,011

9 Claims. (Cl. 53—3)

This invention relates to an improved device for brewing coffee, and other beverages such as tea. The essential object is to provide an infusing apparatus in which the infusing action takes place in a novel manner, which will produce a superior beverage, and which enables a beverage of any desired strength to be obtained from a minimum quantity of coffee grounds or tea leaves.

In the usual type coffee percolator the liquid to be infused is fed in a pulsating stream or fountain to a bed of coffee grounds. The liquid percolates rapidly through the bed of coffee and discharges into a storage chamber. The period of contact of the liquid with the infusing material is quite short. As a result of this it is necessary to use a substantial quantity of coffee and to provide a prolonged re-circulation of the liquid to and through the bed of infusing material to secure the desired strength. On many occasions also, the percolation of the liquid through the infusing material is so rapid that "washing" occurs, causing fine particles of grounds and certain undesired materials adhering to the grounds to be carried away with the infusion. The infusion in such case may be muddy in appearance and have an objectionable taste.

According to the present invention the liquid is fed to a bed of infusing material in a continuous stream, as in the ordinary percolator, but arrangement is made to prolong the period of contact of the liquid with the material. A relatively brief soaking of the infusing material in the liquid occurs, and the liquid through automatically operating mechanism is periodically withdrawn from the infusing material. More specifically, the invention contemplates feeding the liquid to be infused in a continuous stream to the infusing material, allowing the liquid to build up in contact with the infusing material to a predetermined quantity, discharging such quantity, and repeating these operations until an infusion of the desired strength had been obtained. The feed of liquid to the infusing material continues during the whole process since the mechanism for recurrently discharging infused liquid from contact with the infusing material in predetermined quantity is arranged to operate independently of the feed of the liquid to the infusing material.

The inventive structure is of such character that it may be universally applied to ordinary types of percolators and will adapt the same to function according to the novel procedure above described.

A particular feature of the invention involves a periodically operating siphon which will function at repeated intervals to discharge liquid from the zone of the infusing material. The siphon will be located in a container in which the liquid from the incoming stream will rise in contact with the infusing material. The siphon will remain inoperative until the liquid rises to a predetermined level, and will then automatically operate to discharge the collected liquid. When the liquid has been discharged the siphon will cut off and remain inoperative until the liquid stream, which continues during the entire operation, has again raised the liquid to the predetermined level, whereupon the siphon again discharges.

It may be mentioned that where, as here, there is a continuing inflow of liquid to the siphon chamber, considerable difficulty may be experienced in causing the siphon to cut off and remain inoperative until the liquid rises to a desired level. Unless special precautions are taken an equilibrium level may be reached at which the siphon will continue to discharge at the same rate liquid is supplied to the siphon chamber, and in such event the liquid level will rise no farther, and the siphon will not operate periodically as desired. The siphon forming a part of the present invention is specially designed to have a definite cut off point which will insure the alternate building up of liquid in contact with the infusing material to a predetermined level and the periodic discharge of the infused liquid when such level has been reached.

While I have found it desirable to prolong the time of contact of the liquid with the infusing material rather than to allow the liquid to quickly percolate through and away from the material, the contact or soaking period should be relatively brief. It is well recognized that if the liquid is allowed to remain in contact with the infusing material for any considerable length of time undesirable essences may be withdrawn. The siphoning device and related parts of the inventive structure are therefore so designed that the period of contact will be of relatively short duration.

The invention will be understood from the illustrative embodiments shown in the accompanying drawings and the following detailed description thereof.

In such drawings:

Fig. 1 is a fragmentary vertical section of a simple form of coffee percolator with the present invention embodied therein;

Fig. 2 is a fragmentary view in side elevation of certain parts of the inventive structure;

Fig. 3 is a view taken at the line 3—3 of Fig. 1;

Fig. 4 is a top plan view of the structure shown in Fig. 1 with the percolator lid removed;

Fig. 5 is a plan view similar to Fig. 4 with a further part removed;

Fig. 6 is a similar view with certain parts appearing in both Figs. 4 and 5 removed;

Figs. 7 and 8 are fragmentary views taken at right angles to each other showing details of the siphoning device;

Figs. 9, 10 and 11 are fragmentary views illustrating three further arrangements of the siphoning device; and, Fig. 12 is a fragmentary view in sectional elevation illustrating the modification of a part of the structure shown in Fig. 1.

A conventional coffee percolator 15 is shown in the drawings, the same having a liquid storage chamber 16, and a fountain tube 17 through which upon the application of heat to the percolator liquid is forced upwardly in a pulsating stream and discharged from its upper end. In the upper part of the percolator is an infusing chamber generally designated by the numeral 18 adapted to contain the infusing material, and into which the stream from the fountain tube discharges.

According to the invention the infusion chamber 18 is housed within a container having imperforate side and bottom walls 19 and 20. Such container is preferably provided at its upper end with a perforate top member 21 through which liquid from the fountain tube runs into the infusing chamber 18.

A siphoning tube 22 is provided to periodically discharge liquid from the imperforate container. Such tube is preferably, and as shown, of an inverted U-shape and extends upwardly to a point slightly below the perforate lid 21. I have found that it is undesirable to employ a siphoning device having sharp angles or abrupt turns in its upper portion. Where such latter device is employed according to the present invention, where there is a continual stream of liquid flowing into the infusion chamber and the siphon must operate periodically, there is sometimes a failure in operation, due probably to a trapping of air in the angular portions thereof, and perhaps also due to certain undesirable capillary action of the liquid in the upper portion of the siphoning device. It is for this reason that I employ a gradual bend in the siphon tube 22, and experience has shown that the more gradual the bend the more satisfactory will be the operation of the device.

The construction of the inlet end 23 of the siphon tube will later be discussed in detail. As shown the same opens at or near the bottom wall 20 of the container. The opposite side of tube 22 extends through the bottom wall 20 and has a discharge end 24 located somewhat below the inlet end 23 so that there always be a pressure differential between the inlet and outlet ends.

Extending centrally of the container is a vertical sleeve or tube 25 through which extends the fountain tube 17. Such member has an enlargement 26 in its lower end forming a seat 27. The latter engages the usual stop 28 on the fountain tube and supports the container on the tube in proper position above the liquid storage chamber 16. The longitudinal position of stop 28 on the fountain tube may vary in different sizes of percolators. The length of the enlarged tubular portion 26 is such that the container may be adjusted vertically in relation to the stop. The container is of a height somewhat greater than the usual perforate coffee container, and it is for this reason that seat 27 is located some distance above the bottom 20. In the event, however, the position of seat 27 is such as to allow the container to sit too low in a particular percolator one or more small metallic washers may be applied over the upper end of the fountain tube to raise the effective height of stop 28 and raise the container to the proper position in the percolator.

The infusing material must be prevented from discharging through the siphon tube 22, and perforate means may be provided in the infusion chamber 18 for this purpose. Preferably, and as shown, a perforate inner container will be employed. As best shown in Fig. 1 the inner container 29 having a perforate bottom wall 31 is loosely fitted in the surrounding solid walled container. The infusing material will be supported on the perforate bottom wall 31. The infusing liquid discharging into the infusing chamber 18 from the fountain tube 17 can freely percolate through the infusing material and out through the perforations in the bottom 31 and side wall 30 of the inner container 29. It will be noted that the side wall 30 of the inner container is spaced away from the solid wall 19 of the outer container. The inner container at its upper end has a supporting flange 32 which rests on the upper edge of the outer container. The perforate bottom wall 31 of the inner container is preferably located above the inlet end 23 of the siphon tube and in spaced relation to the bottom wall 20 of the outer container, thus providing a lower discharge chamber 33 below the infusing chamber 18.

The perforate inner container 29 may be substantially like the coffee container in the usual percolator, but will be formed with a cut out area. A special perforate wall 34, extending around the fountain tube 17 and tubular sleeve 25 is provided, the same forming a space 35 which receives the siphon tube 22. As best shown in Figs. 3 and 4 the apertured covered member 21 overlies space 35 and is provided with a flange 36 engaging wall 34 of the container 29. The overlying portion 37 of the lid member 21 is preferably imperforate so that liquid will not pass downwardly into the lower chamber 33 without contact with the infusing material in the inner container 29. It is desirable, however, to provide an upstanding tubular vent 38 to prevent the building up of pressure at the inlet end of the siphon tube.

With the arrangement as described, heated liquid from the storage chamber 16 will be forced upwardly in a stream through fountain tube 17. The liquid discharging from the upper end of the tube will percolate through the perforate lid 21 into the infusing material in chamber 18, and thence through the perforate bottom wall 31 of the inner container into the lower chamber 33 immediately above wall 20 of the outer container. As the stream continues the liquid level will rise in the outer container and in the inner perforate coffee container 29 until it has reached the level at or near the upper end of the siphon tube 22. By that time the liquid will have had sufficiently prolonged contact with the infusing material to be infused to the desired degree. The siphon will now begin to discharge liquid, which will enter through its inlet end 23 and flow downwardly through its outlet end into the liquid storage chamber 16. The siphon tube 22 is made of sufficient size as to be able to siphon off the stored up liquid at a slightly faster rate than the flow of liquid entering the infusing chamber from the fountain tube 17. I have found that by making the siphon tube 22 of substantially the same bore as the fountain tube 17 the desired results can be obtained, since the fountain tube does not operate to its full capacity because of the pulsating character of the flow of liquid therethrough. The inner container 29 has a multiplicity of perforations therein over a relatively large area of its walls 30 and 34 and bottom 31 so that during operation of the siphon the liquid can flow readily from the bed of infusing material into the lower chamber 33 to be drawn off from the latter chamber by the siphon tube. When discharge chamber 33 has been emptied, or more specifically, when the level of liquid therein has fallen to the level of the inlet end 23 of the siphon tube the siphon will cease operation. The continued stream of liquid from the fountain tube will then again fill up the lower chamber 33 and rise in contact with the infusing material in the infusing chamber 18 until it reaches a level near the top of the siphon tube. The tube will thereupon again come into operation and drain off the accumulated liquid. The periodic rise in liquid and discharge of liquid will continue until the desired strength of infusion is obtained in the liquid storage chamber 16.

When employing the invention it is important that the storage chamber 16 should not be filled too near to the bottom 20 of the outer container. The outlet end 24 of the siphon tube is at a lower level than the inlet end 23 with a view of maintaining a difference in height therebetween sufficient to provide a pressure differential adapted to maintain the siphoning action of tube 22 under the conditions above mentioned. It is desirable that the level of liquid in storage chamber 16 should always be below the outlet end 24. An indicator is provided to signal in the event chamber 16 has been overfilled. As best shown in Figs. 1, 2 and 3 the side wall 19 of the outer container is provided with an indented portion 39 to form a channel 40. A pair of lugs 41 is secured to the side of the outer container supporting a rod 42 for sliding movement. At the lower end of the rod is a small float 43, and at the upper end is an indicator element 44. In the event the liquid storage chamber 16 is overfilled, float 43 will rise and move rod 42 upwardly. Thus by observing or touching the indicator element 44 it is possible to tell when the liqiud is above a satisfactory level in the storage chamber.

Channel 40 formed in the side wall of the outer container which houses the indicator device also serves as a vent to maintain atmospheric pressure in the upper portion of the liquid storage chamber so as to insure proper operation of the siphon.

As previously indicated, an important feature contributing to the successful operation of the invention involves the construction of the inlet end of the siphon tube 23. It is desired that the siphon should operate only periodically so that between the times of discharge the liquid level will build up to a substantial height in the infusing chamber 18. Once the desired level has been reached the siphon will start operating automatically, but there is a considerable problem after the desired quantity has been discharged and when the liquid level falls to the level of the inlet opening of the siphon to cause the siphon to cut off properly and/or to maintain the siphon in inoperative condition until the liquid has again built up to the desired maximum level in the infusing chamber. The problem arises by reason of the fact that there is a continued incoming flow of liquid at all times which tends to constantly raise the level of liquid.

There is no difficulty in causing the siphon to discharge sufficiently rapidly in spite of the continued inflow to lower the liquid level down to the point where the inlet opening of the siphon tube is slightly uncovered. As soon as this occurs a little air will pass from the siphon tube which will slow down the rate of its discharge, whereupon the liquid level will start rising due to the incoming flow. The inlet opening will be almost instantaneously closed before air has entered the siphon tube in sufficient quantity to prevent resumption of the siphoning action by a slight rise in the liquid level. Of course, if the siphon allows either a trickle of liquid or again breaks into a full discharge flow the liquid level cannot be raised to the desired height to accumulate in substantial quantity in contact with the infusing material in the infusing chamber.

To overcome the difficulties just referred to I so form and arrange the inlet end of the siphon that when the siphon has discharged to lower the liquid to the level of the inlet end, sufficient air will be enabled to enter the siphon tube, before the liquid level rises to again close the opening, that operation of the siphon tube will be effectively stopped, and resumed operation will not occur until the liquid level has reached its desired maximum height.

My experiments have shown that the inlet opening should extend in a non-horizontal direction so as not to be parallel to the surface of the liquid. On the other hand I so arranged the inlet opening of the siphon tube that the same shall extend at an angle to the horizontal with the result that the lower the fall of the liquid level below the upper extremity of the opening the greater will be the area of the opening exposed for the intake of air. Measures are also taken to delay the breaking of the liquid seal around the opening until the general liquid level is appreciably below the upper extremity of the opening. Advantage is taken of the capillary attraction of the liquid around the pipe to this end. I have found that if the opening be so formed as to have a downwardly increasing cross section capillary attraction and possibly other causes serve to maintain the opening sealed until the main liquid level has dropped somewhat below the opening with the result that when the effect of capillary attraction is overcome by the further fall of liquid and the seal breaks a sufficiently large area of the opening is uncovered that a substantial quantity of air will rush into the siphon tube and effectively suppress its discharge. Even though with the stopping of the discharge the level starts to rise and again seals the inlet opening enough air will have entered the tube to prevent resumption in operation until the liquid has risen to a level at or near the stop of the siphon tube.

In the embodiment of Figs. 7 and 8 the inlet end portion 23 of the siphon tube is the same as that shown in Fig. 1. The end of the tube is cut at an incline so as to form an opening lying in a plane substantially inclined to the horizontal. As will be evident from Fig. 8 the opening is elliptical in shape and increases progressively in width downwardly from its upper extremity. With such arrangement the liquid tends to maintain a permanent seal around the peripheral edge 45 of the tube until the level has fallen substantially below the upper extremity. Because of the gradually divergent relation of the edges of the opening the effect of capillary attraction is eventually overcome, but by this time the liquid level has dropped sufficiently that a substantial portion of the opening is uncovered for the admission of air when the liquid seal does break.

The desired venting of the siphon tube may also be obtained through the arrangement shown in Fig. 9. Here the end extremity 46 of the siphon tube 47 is cut at right angles to the tube, but the tube itself is substantially more inclined than the tube 23 in the embodiment of Figs. 1 and 7. It will be understood by a comparison of Figs. 7 and 9 that the angular relation of the inlet opening to the horizontal, and also the gradually increasing cross section thereof, considered in a vertical sense, may be obtained either or both by inclining the inlet leg of the siphon tube to the horizontal and cutting the end of the siphon tube so that it will extend at an angle to the horizontal.

The desired delay in the breaking of the liquid seal around the inlet tube until the liquid level has fallen sufficiently to expose a substantial opening for the intake of air may also be obtained according to the arrangement shown in Fig. 10. In this case the fragmentary portion of the siphon tube 48 may be cut square, or as shown, or at a bias so as itself to be parallel to the surface of the liquid. Here one or more grooves 49 are provided in the side wall of the tube adjacent the end extremity to constitute the opening for the intake of air. Such grooves are relatively narrow at their upper end and diverge downwardly in substantially the shape of an inverted U or V. A somewhat similar arrangement is shown in Fig. 11 where the siphon tube 50 is substantially vertical and has a square cut horizontally extending end extremity 51. A side opening 52 is cut in the tube adjacent the end extremity in such manner as to have a gradually increasing width in a downward direction. With the various illustrative forms for the inlet opening of the siphon tube here illustrated and described the siphon will properly cut off when the infused liquid has fallen to a level somewhat below the upper extremity of the opening. Sufficient air will be introduced into the siphon tube before the liquid level under the continued inflow of liquid from the fountain tube rises to again cut off the opening that the siphon tube will not again come into operation until the liquid level rises to the desired maximum. At the latter time, however, the tube will again discharge. The desired periodic filling of the infusing chamber and the periodic emptying thereof by the siphon tube is thus made possible.

It will be apparent that since the opening in the siphon tube is not horizontal the discharge chamber 33 will not be entirely empty. Also, in the event the heating of the percolator be discontinued and the flow of incoming liquid through the fountain tube stopped when the level of liquid has risen only to an intermediate point in the infusing chamber 18, a substantial quantity of liquid may be left in the infusing chamber which cannot be discharged by the siphon. To enable all of the liquid in the infusing chamber 18 and discharge chamber 33 to pass into the liquid storage chamber 16 under all conditions, a simple arrangement such as shown in Fig. 12 may be employed if desired. In such construction the bottom wall 20 of the upper container which, according to Fig. 1, is liquid tight, is provided with one or more small discharge ports 53. Such ports must necessarily be quite small so as not to prevent the rise in liquid in the container during the periods when the siphon is not operating. Desirably also, the portion 54 of the bottom wall immediately surrounding the ports 53 is embossed upwardly so that any grounds settling on the bottom wall 20 will not pass out through the ports into the liquid storage chamber 16.

So far as I am aware I am the first to provide an arrangement whereby limited quantities of liquid are gradually supplied to a bed of infusing material, maintained for a brief period in contact with material, and then automatically discharged from the material in successive recurrent operations. Also, so far as I am aware, I am the first to provide an automatic siphon which will operate successfully to automatically cut off and cut on to build up and then discharge successive quantities where the liquid to be infused is supplied in a constant stream. The scope of the invention is therefore to be determined in accordance with the scope of the appended claims, and not to be construed as limited to the detailed embodiment illustrated in the drawings.

I claim:

1. In an infusion vessel, an upper chamber for infusing material adapted to be filled with liquid, a lower liquid storage chamber, a fountain tube extending up through the upper chamber to the upper portion thereof adapted to feed a continuous stream of liquid from the lower chamber for infusion in the upper chamber, and a periodically operative siphon tube having an inlet end in the lower portion of the upper chamber and an outlet end extending below the upper chamber into the lower liquid storage chamber adapted to discharge to the lower chamber liquid accumulating in the upper chamber said inlet end being formed with an opening extending at a substantial angle to the horizontal.

2. In an infusion vessel, an upper infusing chamber adapted to be filled with liquid and having a space therein for infusing material, a lower liquid storage chamber, a fountain tube for feeding liquid to be infused from the storage chamber to the upper chamber, a siphon tube having an inlet end in the lower portion of the upper chamber, said inlet end being formed with an opening extending at a substantial angle to the horizontal and being adapted to periodically discharge into the lower chamber liquid accumulating in the upper chamber, and a perforate wall member in the upper chamber for separating the inlet end of the siphon tube from infusing material.

3. Infusion apparatus including a lower liquid storage chamber, an upper container adapted to be filled with liquid, a perforate wall member dividing the upper container into an upper infusing chamber and a lower discharge chamber, a fountain tube extending upwardly from the storage chamber through the upper container and discharging liquid into the upper infusing chamber, and a periodically operative siphon tube for discharging liquid from the discharge chamber of the upper container into the lower storage chamber.

4. An infusing device for a coffee percolator comprising a container adapted to be filled with liquid, a sleeve extending upwardly through the center of the container adapted to receive a fountain tube, an inverted U-shaped siphon tube in the container adapted to discharge liquid therefrom and projecting upwardly in the container between the central sleeve and the side wall thereof, said siphon tube having an inlet end adjacent the bottom wall of the container and having an outlet leg projecting downwardly below the bottom of the container, a perforate inner container in the first container surrounding the central sleeve and siphon tube, a wall portion surrounding the siphon tube and separating the same from the infusing chamber, the lower wall of the inner container being located above the inlet end of the siphon tube and forming with the lower wall of the first container a discharge chamber.

5. In a coffee percolator having a liquid storage chamber, an infusing device comprising a container positionable above the liquid storage chamber and adapted to be filled with liquid and housing an infusing chamber and a discharge chamber below the infusing chamber, and a siphon tube adapted to periodically discharge liquid from the container each time a predetermined quantity of liquid accumulates in the infusing chamber, said siphon tube having an inlet end in the discharge chamber below the infusing chamber, and having an outlet end projecting downwardly below the container and adapted to discharge liquid into the space beneath the container so that the same shall be receivable in the liquid storage chamber, the inlet end of the siphon tube being substantially inclined to the horizontal so that the upper extremity of the opening is located in vertically spaced relation to the lower end of the opening.

6. An infusing device for a coffee percolator comprising a container, a perforate wall member dividing the container into an upper infusing chamber and a lower discharge chamber, an upwardly extending tube for discharging liquid upwardly into the infusing chamber, a siphon tube projecting upwardly in the container substantially above the bottom of the infusing chamber, said siphon tube having an inlet end in the discharge chamber below the bottom of the infusing chamber and having an outlet end projecting downwardly through the bottom of the container for discharging liquid into the space beneath the container, said siphon tube being of inverted U-shaped form devoid of sharp bends so as to facilitate the smooth flow of liquid therethrough and prevent the trapping of air therein, said siphon tube being adapted to periodically discharge liquid from the container each time a predetermined quantity accumulates in the infusing chamber, the inlet end of the siphon having an opening angularly related to the horizontal and being automatically operative to prevent the discharge flow of liquid between the time one accumulated quantity of liquid has been discharged and another similar quantity of liquid has accumulated in the infusing chamber.

7. An infusing device for a coffee percolator comprising a container adapted to be filled with liquid, a perforate wall member dividing the container into an upper infusing chamber and a lower discharge chamber, a vertical tube extending upwardly through the container for conducting liquid to the infusing chamber, and a siphon tube projecting upwardly in the container substantially above the bottom of the infusing chamber having an outlet end projecting below the bottom of the container and adapted to discharge liquid substantially vertically below the container, said siphon being periodically operative automatically each time a predetermined quantity of liquid accumulates in the infusing chamber to discharge said accumulated quantity from the container, and being inoperative to discharge liquid between the discharge of one accumulated quantity and the accumulation in the container of the next similar predetermined quantity, said siphon tube having an inlet end in the discharge chamber below the infusing chamber, said inlet end having an opening inclined to the horizontal so as to lie at an angle to the level of liquid in the container, and said opening increasing in cross section in a downward direction.

8. An infusing device for a coffee percolator comprising a container adapted to be filled with liquid and having a discharge chamber in its lower portion, a siphon tube in the container having its inlet end near the bottom of the container and its outlet end opening out below the bottom of the container, a conduit extending up through the container for supplying liquid thereto, a perforate inner container above the discharge chamber surrounding the conduit and forming an infusing chamber, said inner container having a wall portion surrounding the siphon tube and separating the same from the infusing chamber, and a lid member for the first container overlying the siphon tube and the inner container, perforations in the lid member in the area overlying the inner container and an upstanding vent member in the lid in the area thereof overlying the siphon tube adapted to vent the discharge chamber.

9. An infusing device for a coffee percolator comprising a container adapted to be filled with liquid, a perforate wall member dividing the container into an upper infusing chamber and a lower discharge chamber, a central conduit extending up through the container and perforate member for supplying liquid to the infusing chamber, a siphon comprising a tube of inverted U-shaped form secured to the bottom wall of the container and upstanding interiorly of the container in laterally offset relation to the central conduit, said siphon tube having its inlet end in the discharge chamber and having its outlet end opening out through the bottom of the container, said inlet end being formed with an opening extending at a substantial angle to the horizontal and a vertical wall portion upstanding from the perforate wall member between the siphon tube and upper infusing chamber and forming with the discharge chamber a space for the siphon tube separate from the infusing chamber.

BROOKS B. HARDING.